UNITED STATES PATENT OFFICE.

HENRI BOULARD, OF PARIS, FRANCE.

PROCESS FOR THE MANUFACTURE OF ALCOHOL FROM GRAIN IN OPEN VATS WITH THE EMPLOYMENT OF SACCHARIFYING MUCORS.

1,266,657.   Specification of Letters Patent.   Patented May 21, 1918.

No Drawing.   Application filed December 7, 1916.   Serial No. 135,639.

*To all whom it may concern:*

Be it known that I, HENRI BOULARD, of 117 Rue Saint-Lazare, Paris, France, chemist, have invented a new and useful Improved Process for the Manufacture of Alcohol from Grain in Open Vats with the Employment of Saccharifying Mucors, which improvement is fully set forth in the following specification.

Commercial processes hitherto employed for the manufacture of alcohol from grain by mucors may be divided into two classes:—

The processes employed by the Chinese and the Annamites and certain tribes in Central Africa.

The processes employed in Europe.

(a) In the processes employed by the Chinese and the Annamites the grain (rice and kaoliang) which serves for the manufacture of alcohol is boiled in water in earthenware or iron pots but without steam pressure. It is then cooled and dredged with a powder obtained by crushing "men." Men is a ferment containing different kinds of mucors and yeasts which are preserved in more or less boiled starch; it is divided into small flat and rounded loaves about five to six centimeters in diameter and about two centimeters thick.

In this process chance mucors and yeasts are employed simultaneously. The mucors and the yeasts are allowed to develop at the surface of the boiler grain without the addition of water, and it is only when saccharification is fairly advanced that the grain is placed in earthenware jars with the addition of a certain volume of water which then favors the development of the yeasts owing to the sugar already produced and to the extracts which are suspended in the liquid. The yields thus obtained are naturally very small and vary between 20% and 34% according to the grain employed, the latter figure being only reached when the process is carried out to perfection.

(b) In commercial processes employed in Europe the principle is entirely different and may be summarized as follows:—

1. The different organisms (mucors and yeasts) which take part in the manufacture of alcohol from grain are employed separately and successively. In the process termed "amylo" the grain is boiled under pressure so as to obtain a fluid must which is delivered into a vat which, in order to avoid the intervention of other microbes, is completely closed. When the must has cooled to a suitable temperature (37 to 39° C.) a pure culture of mucor, for example, mucor beta or mucor Delemare, is sown in the vats. When saccharification is very advanced, a pure culture of yeast is then sown so that the two organisms work singly and successively in the vat as above stated.

2. In the process in which mucor Boulard No. 5 is employed and which is called the Boulard process, the organisms employed (mucor Boulard No. 5 and Boulard yeasts Nos. 21 to 30) are so robust that it is no longer necessary to work with pure cultures, that is to say, separately. In other words, if for any reason other microbes penetrate into the fermentation vats work is not arrested; owing to the robustness of these organisms the process is carried out in an absolutely different manner from other processes hitherto employed and possesses, as has been set out in the French specification No. 464,601, dated October 29th, 1913, the following advantages:—

Absolute sterilization of the air is no longer necessary; this from the commercial point of view results in the elimination of air filters the use of which greatly complicates the apparatus, and the elimination of tubing.

The work may be carried out in much more concentrated musts so that the daily production from the distilleries may be augmented to a considerable extent which varies from 30 to 50% without raising the general cost.

It is no longer necessary to employ a completely air tight plant and especially the vats because the intervention of alien microbes does not hinder the work and does not diminish the yield to a material extent.

In processes hitherto employed the yields obtained were seriously diminished by infections derived especially from the interference of lactic or butyric ferments which killed the organisms employed; these risks no longer exist if the robust and quickly working organisms are employed and a perfectly different and much more simple process may be used which requires fewer precautions and less apparatus while producing superior results and yields.

The delicacy of the old organisms employed (mucors and yeasts) necessitated different apparatus and a different process such as the employment of yeast vats, sterilization of the fermentation vats with water or steam before introduction of the must into the vats, filtration of the air in wadding filters, cooking by expansion which requires two apparatus, a cooker and an expansion vessel.

French distilleries which have hitherto employed the mucor Boulard have increased their daily production and their yield in the enormous proportion set out above. An important economy in coal is also effected owing to the economies in steam, due to a greater cooking concentration, and to the greater quantity of alcohol obtained in the musts and also due to the fact that the fermentation vats do not require to be sterilized before introduction of the must.

The process according to this invention, in which mucor Boulard No. 5 or other mucors which may possess the same qualities are employed, differs substantially from the processes hitherto described and used. The invention relates to a process for the manufacture of alcohol from grain in open wood or iron vats by the employment of mucors.

The mucors employed, for example, mucor Boulard No. 5, are first cultivated in a yeast vat whose volume is one fifth or one sixth of the volume of the main working vat. The cooked grain (rice, maize, manioc, kaoliang, etc.) is brought to the condition of a fluid must and is introduced into the yeast vat and cooled to the temperature of 43° C. It is then sown with a balloon of mucor and after a certain number of hours the yeast vat is filled with filaments of mucors.

Further the necessary quantity of grain to fill with must the large fermentation vat is cooked in the same cooker; this vat may be of iron or wood and may be open or closed as there is not any necessity for sterilizing it.

The vat is unprovided with agitators as agitation takes place by the air passing in at the bottom; this air is not sterilized or even washed in any manner by bubbling or otherwise. The vat is provided with inner cooling worms and when its temperature has fallen to 40 or 43° C. it is sown with the ferment which has been cultivated in the small closed yeast vat. Under these conditions in a very small number of hours the mucor fills the large vat and saccharification of the starch commences.

Shortly after the mucor ferment is introduced into the large vat a balloon of yeast containing a pure yeast is poured in. The concentration of the must should be such that alcoholic fermentation commences when saccharification of the starch is almost finished. If, for example, rice at 18% concentration is employed saccharification of the must is almost complete at the end of twenty-four hours, and the quantity of glucose then attains 90 grams per liter. If the yeast has been sown at the required moment, i. e. from three to four hours after sowing the mucor ferment (supposing that Boulard yeast 21 bis, for example, is employed) fermentation is very active. At the end of twenty-four hours and forty-eight hours after sowing the mucor ferment the process is complete: i. e. there remains in the vat neither starch nor glucose.

This process differs in the following manner from those hitherto employed:—

1. So far as relates to working with mucors hitherto ferments have never been sown in open vats. In prior processes yeast vats, it is true, have been employed, but it was only to gain time, and these yeast vats served to sow large closed vats in which as pure cultures as possible of mucors and yeasts were maintained; in the present process on the contrary the employment is claimed of mucors and yeasts under absolutely novel conditions which hitherto have never been carried out commercially.

In this new process the harmful ferments are constantly present. The lactic ferment which in the amylo process completely stopped work in closed vats is always present; in a process carried out in conformity with the present invention and in open vats the presence of lactic ferment does not result in any loss in the yield or on the duration of the process owing to the method above described and to the employment of the robust organisms in question.

2. In the native processes which have been above described mucors and yeasts in open vats or even in earthenware jars are employed, but the results obtained are very indifferent; this is because several chance species of mucors and numerous chance species of yeasts operate together and not successively, and because, due to the lack of robustness of these species owing to non-selection, harmful bacteria and different microbes from the air, such as lactic, butyric or acetic ferments, develop in the must at the expense of the starch which explains the small yield obtained under these conditions.

3. One of the bases of this novel process besides the foregoing is a principle of bacteriology which has not hitherto been applied commercially and is as follows:—

The concentration of the amylaceous matters (maize, rice, manioc, rice brismes, potatoes, etc.) should be calculated in such a manner that the period of working in the large vats, i. e. saccharification and alcoholic fermentation should terminate about forty-two hours after sowing the mucor ferment. During this period the ferments and bacteria which are in the air or at the surface of the grain have not time to develop sufficiently in the musts to create a medium capable of hindering the action of the mucors or robust and selected yeasts.

Claims:

1. The process of making alcohol consisting in saccharifying liquid must with robust mucors and after the mucor filaments have attained a vigorous growth fermenting the resulting saccharine bodies with pure yeast thereby completing the conversion of the starch of the must into alcohol before harmful bacteria develop to hinder the action of the mucors and yeast.

2. The process of making alcohol consisting in providing from liquid must two portions differing in volume, sowing the portion of smaller volume with robust, saccharifying mucors and when the mucor filaments have developed therein introducing the same into the larger portion of must to therein develop and saccharify the starch of the second portion of must, and shortly after saccharification starts introducing pure yeast to ferment the saccharine matter as developed from the starch thereby increasing the velocity of saccharification and fermentation in the second portion and avoiding growth of bacteria harmful to the formation of alcohol.

3. The process of making alcohol, consisting in providing from liquid must two portions having volumes of about 1 to 5, sowing the smaller portion with mucor Boulard No. 5 and when the mucor filaments have developed introducing the same into the larger of said portions to therein develop and saccharify the starch, shortly after saccharification starts introducing pure yeast to ferment the saccharine matter as developed from the starch thereby increasing the velocity of saccharification and fermentation in the second portion and avoiding growth of bacteria harmful to the formation of alcohol.

In testimony whereof I have signed this specification in the presence of two subscribing witnesses.

HENRI BOULARD.

Witnesses:
GASTON DE MESTRAL,
CHAS. P. PRESSLY.